(12) United States Patent
Jang et al.

(10) Patent No.: US 8,610,544 B2
(45) Date of Patent: Dec. 17, 2013

(54) METHOD FOR DETERMINING OPTIMAL FRAME SIZE FOR TAG COLLISION PREVENTION IN RFID SYSTEM

(75) Inventors: Hyunmin Jang, Gyeonggi-do (KR); Wonjun Lee, Seoul (KR); Donghwan Lee, Seoul (KR); Joosik Lee, Seoul (KR); Sukil Kang, Gyeonggi-do (KR); Youngshin Yoon, Seoul (KR); Junghee Han, Seoul (KR)

(73) Assignee: SK Telecom Co, Ltd., Jung-Ga, Seoul (KR)

( * ) Notice: Subject to any disclaimer, the term of this patent is extended or adjusted under 35 U.S.C. 154(b) by 984 days.

(21) Appl. No.: 12/623,999

(22) Filed: Nov. 23, 2009

(65) Prior Publication Data

US 2011/0063085 A1 Mar. 17, 2011

Related U.S. Application Data

(63) Continuation of application No. PCT/KR2008/002907, filed on May 23, 2008.

(30) Foreign Application Priority Data

May 23, 2007 (KR) .................. 10-2007-0050509

(51) Int. Cl.
*H04Q 5/22* (2006.01)
(52) U.S. Cl.
USPC ..... 340/10.2; 340/3.41; 340/572.1; 340/10.1; 340/10.3; 340/10.31; 340/10.32; 340/10.33; 340/10.34; 370/314; 370/347; 370/348; 235/385

(58) Field of Classification Search
None
See application file for complete search history.

(56) References Cited

U.S. PATENT DOCUMENTS

| | | | | |
|---|---|---|---|---|
| 2007/0096877 A1* | 5/2007 | Quan et al. | .................. | 340/10.2 |
| 2007/0126555 A1* | 6/2007 | Bandy | .................. | 340/10.2 |
| 2008/0079544 A1* | 4/2008 | Kodialam et al. | .......... | 340/10.2 |
| 2008/0106383 A1* | 5/2008 | Choi et al. | .................. | 340/10.2 |
| 2008/0150674 A1* | 6/2008 | Park et al. | .................. | 340/3.41 |
| 2010/0026462 A1* | 2/2010 | Lim et al. | .................. | 340/10.1 |

\* cited by examiner

*Primary Examiner* — Benjamin C Lee
*Assistant Examiner* — Curtis King
(74) *Attorney, Agent, or Firm* — Baker Hostetler, LLP

(57) ABSTRACT

The present invention relates to a method for determining an optimal frame size for tag collision prevention in an Aloha-based RFID system in which frame sizes limited to a certain unit are used to identify tags, the method including the steps of using an RFID for: (a) calculating an estimated optimal frame value for the RFID reader identifying the tags; (b) calculating expected time delays per tag of a left-hand frame size and a right-hand frame size, which show the smallest differences with respect to the estimated optimal frame value, among the frame sizes; (c) comparing, the expected time delay per tag of the left-hand frame size with that of the right-hand frame size; and (d) determining a frame size which has a smaller expected time delay per tag, between the left-hand frame size and the right-hand frame size, to be an optimal frame size.

8 Claims, 7 Drawing Sheets

Figure 5A

| Slot | 1 | 2 | 3 |
|---|---|---|---|
| Result of Transmission | Collision | Collision | Success |
| 1st Tag | Transmission | | |
| 2nd Tag | | Transmission | |
| 3rd Tag | | | Transmission |
| 4th Tag | Transmission | | |
| 5th Tag | | Transmission | |

Figure 5B

| Slot | 1 | 2 | 3 | 4 | 5 | 6 | 7 | 8 | 9 |
|---|---|---|---|---|---|---|---|---|---|
| Result of Transmission | Success | Idle | Collision | Idle | Success | Idle | Success | Idle | Idle |
| 1st Tag | Transmission | | | | | | | | |
| 2nd Tag | | | Transmission | | | | | | |
| 3rd Tag | | | Transmission | | | | | | |
| 4th Tag | | | | | Transmission | | | | |
| 5th Tag | | | | | | | Transmission | | |

METHOD FOR DETERMINING OPTIMAL FRAME SIZE FOR TAG COLLISION PREVENTION IN RFID SYSTEM

This application is a continuation of Korean PCT Application No. PCT/KR2008/002907 filed on May 23, 2008 which designates the United States of America.

TECHNICAL FIELD

The present invention relates to a method for determining an optimal frame size for tag collision prevention in a radio frequency identification (RFID) system, and more particularly to a method for maximizing the efficiency of tag identification by determining a frame size to minimize an expected time delay per tag in order to prevent collision between tags in an Aloha-based RFID system.

BACKGROUND ART

One important function required in an RFID system is to rapidly and efficiently identify tags. However, in a case where a plurality of tags exist within an identification range of an RFID reader, since all the tags attempt to respond through an equal channel at the same time, collisions occur, thereby delaying tag identification. Also, an idle phenomenon where tags do not respond at all may occur in a certain channel, which also decreases the efficiency of tag identification. Therefore, it is necessary to develop an RFID tag identification method capable of maximizing the efficiency of an RFID system by controlling inevitable collisions, the idle phenomenon, and the like, to be minimized under the limited functions of tags.

With rapid development of information communication technologies, efforts are being made to create a ubiquitous environment in which information communication devices can be easily and conveniently used in regular life, regardless of time and place. In order to create such a ubiquitous environment, a wireless identification technology enabling information communication devices to efficiently perceive and identify each other from a remote is necessary. The RFID technology is becoming attractive as a representative wireless identification technology.

The RFID is one of automatic identification technologies, such as a barcode, a magnetic sensor, an IC card, and the like, and is the most up-to-date technology used for wirelessly identifying data stored in a microchip by using an ultra-short wave or a long wave. The RFID technology is increasingly used in the industrial world to such a degree that the RFID technology is regarded as a substitute technology for the barcode, which is currently used in distribution and circulation fields, financial services, etc.

FIG. 1 is a block diagram illustrating the configuration of a conventional RFID system.

As shown in FIG. 1, in order to identify a tag 120 attached on an object, a conventional RFID reader 110 identifies an identifier stored in the tag 120 by transmitting/receiving RF signals to/from the tag 120.

In this case, tag identification protocols used for the conventional RFID reader 120 to identify the tag 120 may be roughly classified into Aloha-based protocols and tree-based protocols.

The Aloha-based protocols include a pure Aloha protocol which cannot control collisions between identifiers, the idle phenomenon, and the like at all, a slotted Aloha protocol which can control collisions and occurrence of the idle phenomenon through time slots, and a frame-slotted Aloha protocol which can more efficiently control collisions and the occurrence of the idle phenomenon by grouping slots in units of frames. Here, the collision phenomenon between identifiers represents that the conventional RFID 110 receives two or more identifiers at the same time, and the idle phenomenon represents that the conventional RFID 110 cannot receive an identifier during a certain time period.

Meanwhile, the tree-based protocols employ a method of dividing tags into two groups upon occurrence of a collision and extending the search space.

Of the Aloha-based protocols and the tree-based protocols, the Aloha-based protocols are expected to be used as a standard for the RFID technology.

As described above, the Aloha-based protocol, and especially the frame-slotted Aloha protocol, which is to be widely used in the future, employs a method in which each of one or more tags selects one slot within a frame size, which corresponds to the number of slots constituting one frame, the efficiency of tag identification significantly varies depending on the adjusted frame size. For example, in an environment where a plurality of tags 120 exists around the RFID reader 210, if the RFID reader 210 uses too small a frame size, the number of collision slots increases, so that the tag identification performance becomes degraded. In contrast, if the RFID reader 210 uses too large a frame size, the number of idle slots increases, so that the tag identification performance becomes degraded.

DISCLOSURE

Technical Solution

In order to solve such a problem, adaptive frame-slotted Aloha schemes, including a random-slotted Aloha scheme, a dynamic frame-slotted Aloha scheme, etc., have been proposed, but the conventional adaptive frame-slotted Aloha schemes have a problem in that they lack a means for exactly estimating a frame size appropriate for a plurality of tags.

Therefore, the present invention has been made in view of the above-mentioned problems, and it is an object of the present invention to provide a method for maximizing the efficiency of tag identification by means of a process for exactly estimating an appropriate frame size in an Aloha-based RFID system.

In order to achieve the above-mentioned object, there is provided a method for determining an optimal frame size for tag collision prevention in a radio frequency identification (RFID) system in which frame sizes limited to a certain unit are used to identify tags, the method including the steps of: (a) calculating, by an RFID reader, an estimated optimal frame value, the RFID reader identifying the tags; (b) calculating, by the RFID reader, expected time delays per tag of a left-hand frame size and a right-hand frame size, which show the smallest differences with respect to the estimated optimal frame value, among the frame sizes; (c) comparing, by the RFID reader, the expected time delay per tag of the left-hand frame size with that of the right-hand frame size; and (d) determining, by the RFID reader, a frame size which has a smaller expected time delay per tag, between the left-hand frame size and the right-hand frame size, to be an optimal frame size.

According to another aspect of the present invention, there is provided a method for determining an optimal frame size for tag collision prevention in a radio frequency identification (RFID) system in which a plurality of frame sizes are used to identify a plurality of tags, the method including the steps of: (a) calculating, by an RFID reader, a first middle point which is a middle point of the plurality of frame sizes; (b) calculating, by the RFID reader, an expected time delay per tag with respect to each of the first middle point and first both-sided frame sizes, including a minimum frame size and a maximum frame size among the plurality of frame sizes; (c) comparing, by the RFID reader, the expected time delay per tag of the first middle with the expected time delays per tag of the first both-sided frame sizes; (d) determining, by the RFID reader, the first middle point to be an optimal frame size when the expected time delay per tag of the first middle point is smaller than the expected time delays per tag of the first both-sided frame sizes in step (c); (e) calculating, by the RFID reader, a second middle point, which is a middle point between the first middle point and a first frame size causing a smaller expected time delay per tag between the first both-sided frame sizes when the expected time delay per tag of the first middle point is greater than the expected time delays per tag of the first both-sided frame sizes in step (c), and then calculating an expected time delay per tag with respect to each of the second middle point and second both-sided frame sizes which include the first frame size and the first middle point; (f) comparing, by the RFID reader, the expected time delay per tag of the second middle point with the expected time delays per tag of the second both-sided frame sizes; (g) determining, by the RFID reader, the second middle point to be the optimal frame size when the expected time delay per tag of the second middle point is smaller than the expected time delays per tag of the second both-sided frame sizes in step (f); and (h) repeatedly performing, by the RFID reader, a bisection search process which includes steps (a) to (g) until the optimal frame size is determined from among the plurality of frame sizes, when the expected time delay per tag of the second middle point is greater than the expected time delays per tag of the second both-sided frame sizes in step (f).

DESCRIPTION OF DRAWINGS

FIGS. 5A and 5B are views explaining examples of use of an optimal frame size according to an exemplary embodiment of the present invention;

MODE FOR INVENTION

Figure 1:
FIG. 1 is a block diagram illustrating the configuration of a conventional RFID system.

Hereinafter, preferred embodiments of the present invention will be described with reference to the accompanying drawings. First, it is to be noted that the same elements are indicated with the same reference numerals throughout the drawings. In the following description, a detailed description of known functions and configurations incorporated herein will be omitted when it may make the subject matter of the present invention rather unclear.

Figure 2:
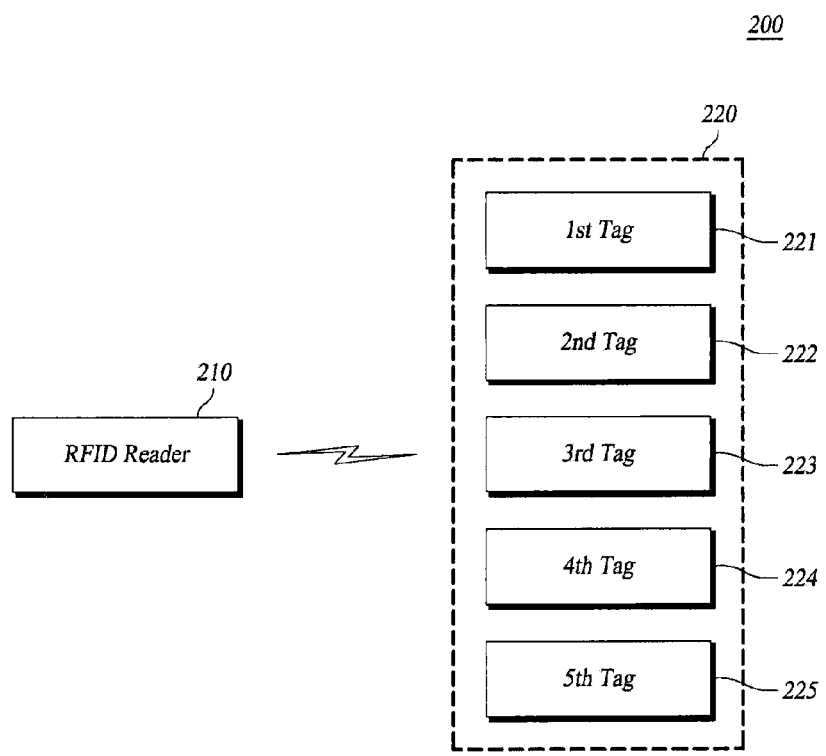
FIG. 2 is a block diagram illustrating the configuration of an RFID system according to an exemplary embodiment of the present invention.

FIG. 2 is a block diagram illustrating the configuration of a radio frequency identification (RFID) system according to an exemplary embodiment of the present invention.

According to an exemplary embodiment of the present invention, an RFID system 200 includes an RFID reader 210 and a plurality of tags 220, which are located within an identification range of the RFID reader 210. Although the present invention is described about a case where the tags 220 include a first tag 221, a second tag 222, a third tag 223, a fourth tag 224, and a fifth tag 225, the present invention may be applied even to cases where more or less tags exist.

The RFID reader 210 according to the present invention may be used as an independent device, or may be included in an apparatus, including a mobile terminal, a personal digital assistance (PDA), a notebook computer, etc.

Although the present invention is described on the assumption that the RFID reader 210 employs an adaptive frame-slotted Aloha scheme, the present invention can be applied to cases where the RFID reader 210 employs an Aloha-based scheme other than the adaptive frame-slotted Aloha scheme.

The scheme of performing a first process of a tag identification process by the RFID reader 210 according to the present invention is the same as the conventional adaptive frame-slotted Aloha scheme, and is described below for an easy understanding of the configuration of the present invention. Here, the first process corresponds to a process in which the RFID reader 210 first identifies the plurality of tags 220.

In the first process of the tag identification process, the RFID reader 210 transmits a first frame size, which has been set as an initial value, to the plurality of tags 220. Here, the tag identification process is progressed in a unit frame period. That is, first, the RFID reader 210 performs the first process of transmitting the first frame size (i.e. the number of slots in the first frame), which has been set as an initial value, to the plurality of tags 220, and identifying one or more tags among the tags 220 through one or more slots corresponding to the first frame size. After the first process, the RFID reader 210 repeats a process of determining an optimal frame size according to an exemplary embodiment of the present invention, transmitting the optimal frame size to the plurality of tags 220, and identifying one or more tags among the tags 220, in a unit frame period.

Each of the tags 220, that is, the first tag 221, the second tag 222, the third tag 223, the fourth tag 224, and the fifth tag 225, which have received a first frame size, selects a slot (i.e. a slot sequence number) to use within the first frame size through their respective random number generator (RNG). Then, the RFID reader 210 transmits an identifier request message, requesting a tag identifier to be transmitted, to the first tag 221, the second tag 222, the third tag 223, the fourth tag 224, and the fifth tag 225 in a unit slot period through one tag identification process, and receives one or more identifiers from the plurality of tags 220. For example, when the first frame size represents three slots, including slot #1, slot #2, and slot #3, the RFID reader 210 transmits an identifier request message to the plurality of tags 220 in order to identify the identifier of any one of the tags 220 in slot #1, and receives one or more identifiers from one or more tags, having selected slot #1, among the tags 200. Thereafter, similar to in slot #1, in each of slots #2 and #3, the RFID reader 210 transmits an identifier request message to the plurality of tags 220, and receives one or more identifiers.

In this case, one slot starts when the RFID reader 210 transmits an identifier request message to the plurality of tags 220, and is terminated when the RFID reader 210 receives one or more identifiers from the plurality of tags 220.

In the first frame, whenever one slot is terminated, the RFID reader 210 records a tag identification result representing whether one tag has responded, (i.e. one identifier has received) (success slot), two or more tags have responded (i.e. two or more identifiers have received) (collision slot), or no tag has responded (i.e. no identifier has received) (idle slot), in the corresponding slot, thereby completing the first process.

When the first process has completed, the RFID reader 210 determines an optimal frame size according to an exemplary embodiment of the present invention, and transmits a frame having the optimal frame size to the plurality of tags 220.

The RFID reader 210 determines the optimal frame size by equations 1 and 2 below.

$$\left\{\frac{m}{L}\left(1-\frac{1}{L}\right)^{m-1}\right\}^{-1} X \left\{1-\left(1-\frac{1}{L}\right)^m\left(1+\frac{m}{L-1}\right) X Tcoll + \left(1-\frac{1}{L}\right)^m XTidle + \frac{m}{L}\left(1-\frac{1}{L}\right)^{m-1} XTsucc\right\}$$ [Math Figure 1]

Equation 1 is used to calculate an expected time delay per tag, that is, an expected time delay required for identifying each tag, wherein "L" represents the number of slots in one frame (i.e. frame size), "m" represents the number of tags, "Tsucc," "Tcoll," and "Tidle" represent time delays caused by a success slot, a collision slot, and an idle slot, respectively.

According to the present invention, when the expected time delay per tag is minimized, the expected efficiency of tag identification, representing how many tags can be identified during the same time, is maximized. That is, since a maximum expected efficiency of tag identification can be obtained through a minimum expected time delay per tag, the maximum expected efficiency of tag identification, that is, an optimal frame size, can be obtained by continuously applying a frame size minimizing the resultant value of equation 1 to a frame.

$$* \left\{1 - e^{\frac{1+W\left(\frac{r-1}{e}\right)}{m}}\right\}^{-1} +$$ [Math Figure 2]

Equation 2 is used to calculate an estimated value of an optimal frame size, wherein "e" represents the Euler's constant, "W( )" represents the Lambert omega function, "*+" represents a floor function, and "r" represents a rate (Tidle/Tcoll) obtained by dividing a time delay of an idle slot by a time delay of a collision slot. Here, when the RFID reader 210 recognizes the number of tags 220, the RFID reader 210 inputs the number of tags 220 into equation 2. In contrast, when the RFID reader 210 does not recognize the number of tags 220, the RFID reader 210 estimates the number of tags 220 by using information recorded during the first process, and inputs the estimated number into equation 2. The technology of estimating the number of tags is generally known in the art, so a detailed description thereof will be omitted.

Since available frame sizes may be limited to a certain unit by a standard used in the RFID system 200 or by a system constraint, when an estimated value of an optimal frame size calculated through equation 2 cannot be applied as an optimal frame size, the RFID reader 210 according to the present invention determines an optimal frame size according to a first embodiment of the present invention, as described below.

For example, when a frame size is limited to natural numbers, the estimated value of an optimal frame size includes a value after the decimal point.

Figure 3:
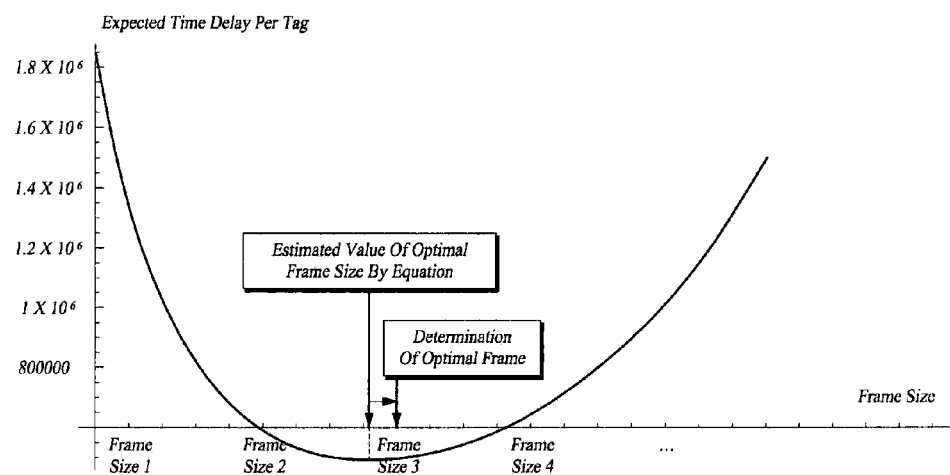
FIG. 3 is a view explaining an example of a configuration for determining an optimal frame size when frame sizes are limited according to the present invention.

According to the first embodiment of the present invention, as shown in FIG. 3, the RFID reader 210 substitutes the number of slots of each of both-sided frame sizes, which are nearest to the estimated value of an optimal frame size calculated by equation 2, among limited frames sizes, that is, the number of slots of a left-hand frame size (a frame size having a value lower than the estimated value of the optimal frame size) and the number of slots of a right-hand frame size (a frame size having a value higher than the estimated value of the optimal frame size), which show the smallest differences with respect to the estimated value of the optimal frame size, into equation 1, respectively. Then, the RFID reader 210 compares an expected time delay per tag calculated in the left-hand frame size with an expected time delay per tag calculated in the right-hand frame size. In this case, the number of slots corresponds to the value of "L" in equation 1.

The RFID reader 210 determines a frame size causing the smallest expected time delay per tag between both-sided frame sizes to be an optimal frame size, and transmits the determined optimal frame size to the plurality of tags 220. Here, frame size 1, frame size 2, frame size 3, etc. are used to only distinguish different frame sizes from each other, and are not used to represent the number of slots of each corresponding frame size. For example, frame size 1 may include five slots, frame size 2 may include six slots, and frame size 3 may include seven slots.

According to the first embodiment of the present invention, the RFID reader 210 can recognize the number of tags required for calculating an expected time delay per tag through the first process performed by the RFID reader 210, and "Tsucc," "Tcoll," and "Tidle," which are time delays caused by a success slot, a collision slot, and an idle slot, respectively, are stored in a memory included in the RFID reader 210.

Meanwhile, according to the present invention, when the throughput of the RFID reader 210 is low, it may take a long time for the RFID reader 210 to calculate the estimated value of an optimal frame size by equation 2. Therefore, in this case, according to a second embodiment of the present invention, the RFID reader 210 determines an optimal frame size by a bisection search method using equation 1, as described below. In this case, the RFID reader 210 can recognize the number of tags 220 through the performance of the first process.

Figure 4:
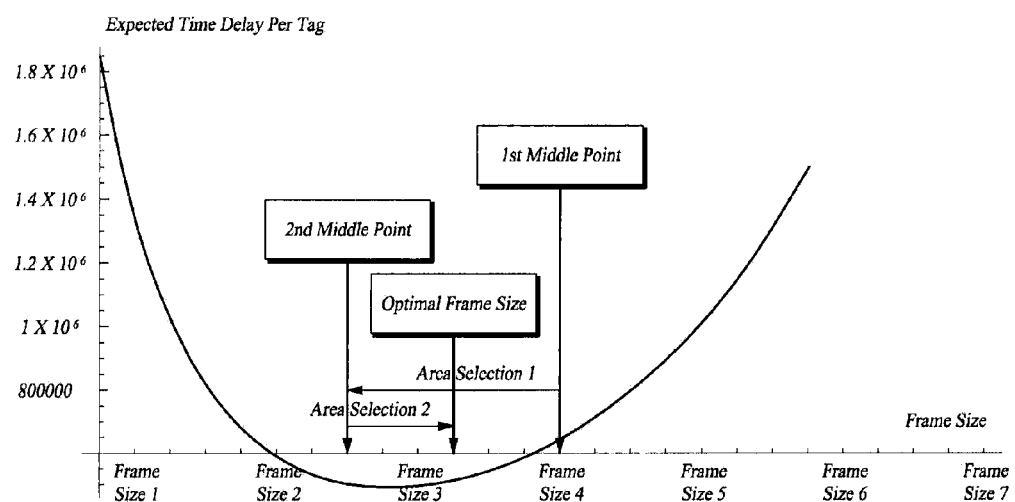
FIG. 4 is a view explaining an example of a configuration for determining an optimal frame size through a bisection search process according to the present invention.

According to the second embodiment of the present invention, as shown in FIG. 4, the RFID reader 210 arranges a plurality of frame sizes available by the RFID reader 210 in regular sequence, and calculates a first middle point, that is, a middle point between a minimum frame size (i.e. frame size 1 in FIG. 4) and a maximum frame size (i.e. frame size 7 in FIG. 4) among the plurality of frame sizes.

The RFID reader 210 substitutes the number of slots of the first middle point and the numbers of slots of first both-sided frame sizes, including the minimum and maximum frame sizes which are furthest away from the first middle point, into equation 1, respectively, and compares calculated expected time delays per tag with each other.

When the expected time delay per tag of the first middle point is smaller than those of the first both-sided frame sizes, the RFID reader 210 determines the frame size of the first middle point to be an optimal frame size, and transmits the optimal frame size, i.e. the frame size of the first middle point, to the plurality of tags 220.

When the expected time delay per tag of the first middle point is greater than those of the first both-sided frame sizes, the RFID reader 210 selects a first frame size (i.e. frame size 1 in FIG. 4), causing a relatively smaller expected time delay per tag between the first both-sided frame sizes, and again calculates a middle point (hereinafter, referred to as a "second middle point") between the first middle point and the first frame size. Then, the RFID reader 210 substitutes the number of slots of the second middle point and the numbers of slots of second both-sided frame sizes, that is, the first frame size (i.e. frame size 1 in FIG. 4) and the first middle point (i.e. frame size 4 in FIG. 4), with respect to the second middle point, into equation 1, respectively, and compares calculated expected time delays per tag with each other.

When the expected time delay per tag of the second middle point is smaller than those of the second both-sided frame sizes, the RFID reader 210 determines the frame size of the second middle point to be an optimal frame size, creates a frame having the optimal frame size, i.e. the frame size of the second middle point, and transmits the created frame to the plurality of tags 220.

When the expected time delay per tag of the second middle point is greater than those of the second both-sided frame sizes, the RFID reader 210 selects a frame size (i.e. frame size 4 in FIG. 4) causing a relatively smaller expected time delay per tag between the second both-sided frame sizes.

Through the aforementioned procedure, the RFID reader 210 may determine a frame size of an $N^{th}$ middle point, which has no space to search, to be an optimal frame size. Also, when the expected time delay per tag of any one of third, fourth, ..., $N^{th}$ middle points, which are middle points after the second middle point, is smaller than those of both-sided frame sizes with respect to the corresponding middle point, the RFID reader 210 may stop the searching operation, determine the frame size of the corresponding middle point to an optimal frame size, and transmit the determined optimal frame size to the plurality of tags 220. For example, when the expected time delay per tag of the third middle point is smaller than those of both-sided frame sizes (i.e. the second middle point and first middle point), as shown in FIG. 4, the RFID reader 210 determines the third middle point to be an optimal frame size.

According to the second embodiment of the present invention, the RFID reader 210 can recognize the number of tags required for calculating an expected time delay per tag through the first process performed by the RFID reader 210, and "Tsucc," "Tcoll," and "Tidle," which are time delays caused by a success slot, a collision slot, and an idle slot, respectively, are stored in an internal memory of the RFID reader 210.

When the RFID reader 210 determines an optimal frame size according to the first or second embodiment of the present invention, and identifies the identifiers of tags 220, including the first tag 221, the second tag 222, the third tag 223, the fourth tag 224, and the fifth tag 225, the collision phenomenon between the identifiers and the idle phenomenon can be minimized.

FIGS. 5A and 5B are views explaining examples of use of an optimal frame size according to an exemplary embodiment of the present invention.

FIG. 5A shows a tag identification result recorded in the RFID reader 210 when an optimal frame size according to an exemplary embodiment of the present invention has not been determined by the RFID reader 210, and FIG. 5B shows a tag identification result recorded in the RFID reader 210 when an optimal frame size according to an exemplary embodiment of the present invention has been determined by the RFID reader 210.

The respective RFID systems of FIGS. 5A and 5B are under the circumstances that five tags 220 exist and both the success slot and the collision slot have a time delay of one unit of time, wherein each idle slot in FIG. 5B has a time delay of 0.2 unit of time, so that a time delay rate of the idle slot to the collision slot is 0.2.

In the case of FIG. 5A, since the RFID reader 210 transmits too small a frame size to the plurality of tags 220, relatively more collision slots occur, so that the expected efficiency of tag identification is degraded.

In the case of FIG. 5B, since the RFID reader 210 determines an optimal frame size (i.e. 9 slots) by using at least one of equations 1 and 2, and transmits the optimal frame size to the plurality of tags 220, the number of occurring collision slots is minimized, so that the expected efficiency of tag identification is maximized.

The tag identification efficiencies of FIGS. 5A and 5B are calculated to be "1/3=0.333" and "3/4.8=0.625," respectively, so that it can be understood that the case of FIG. 5B can identify many more tags during the same time period, wherein each numerator "1" and "3" represents the number of success slots, and each denominator "3" and "4.8" represents a total time delay of one frame.

Figure 6:
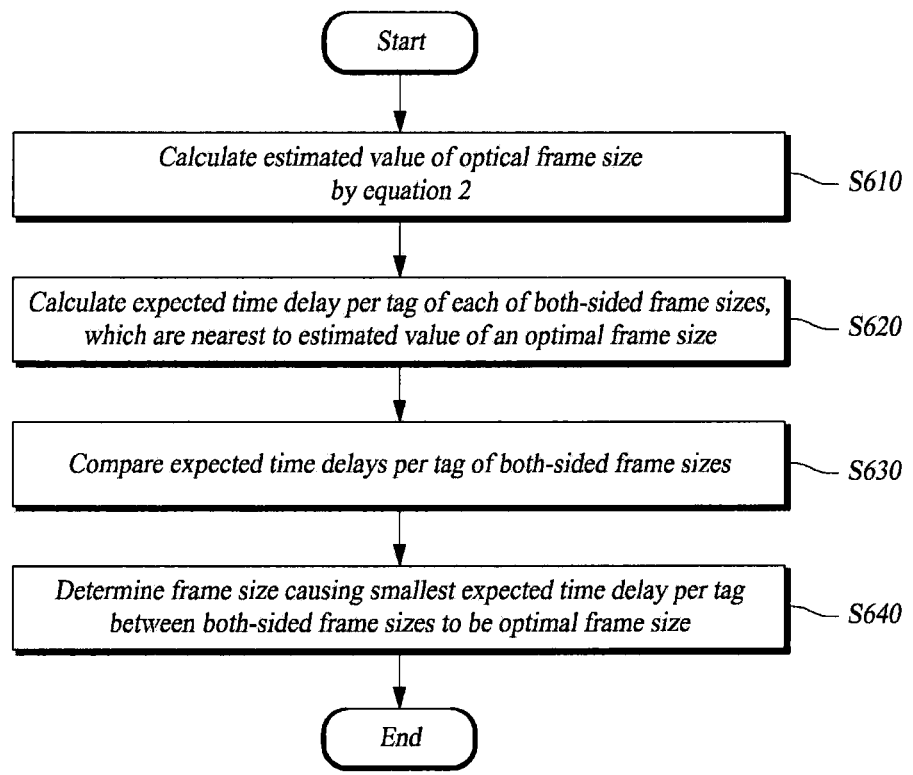
FIG. 6 is a flowchart illustrating a procedure for determining an optimal frame size according to a first embodiment of the present invention.

FIG. 6 is a flowchart illustrating a procedure for determining an optimal frame size according to the first embodiment of the present invention.

The first embodiment of the present invention is used for the RFID reader 210 to complete the first process and then to determine an optimal frame size when frame sizes available by the RFID reader 210 is limited.

After completing the first process, the RFID reader 210 calculates the estimated value of an optimal frame size by using equation 2 in step 610.

The RFID reader 210 substitutes the number of slots of a left-hand frame size and the number of slots of a right-hand frame size, which show the smallest differences with respect to the estimated value of the optimal frame size, among the limited frame sizes, into equation 1, respectively, thereby calculating an expected time delay per tag of the left-hand frame size and an expected time delay per tag of the right-hand frame size in step 620. Here, the RFID reader 210 can recognize the number of tags required for calculating an expected time delay per tag through the first process performed by the RFID reader 210, and "Tsucc," "Tcoll," and "Tidle," which are time delays caused by a success slot, a collision slot, and an idle slot, respectively, are stored in an internal memory of the RFID reader 210.

The RFID reader 210 compares the expected time delay per tag of the left-hand frame size, with the expected time delay per tag of the right-hand frame size in step 630, and determines a frame size causing a smaller expected time delay per tag, of both expected time delays per tag, to be an optimal frame size in step 640. Here, frame size 1, frame size 2, frame size 3, etc. are used to only distinguish different frame sizes from each other, and are not used to represent the number of slots of each corresponding frame size. For example, frame size 1 may include five slots, frame size 2 may include six slots, and frame size 3 may include seven slots.

Figure 7:
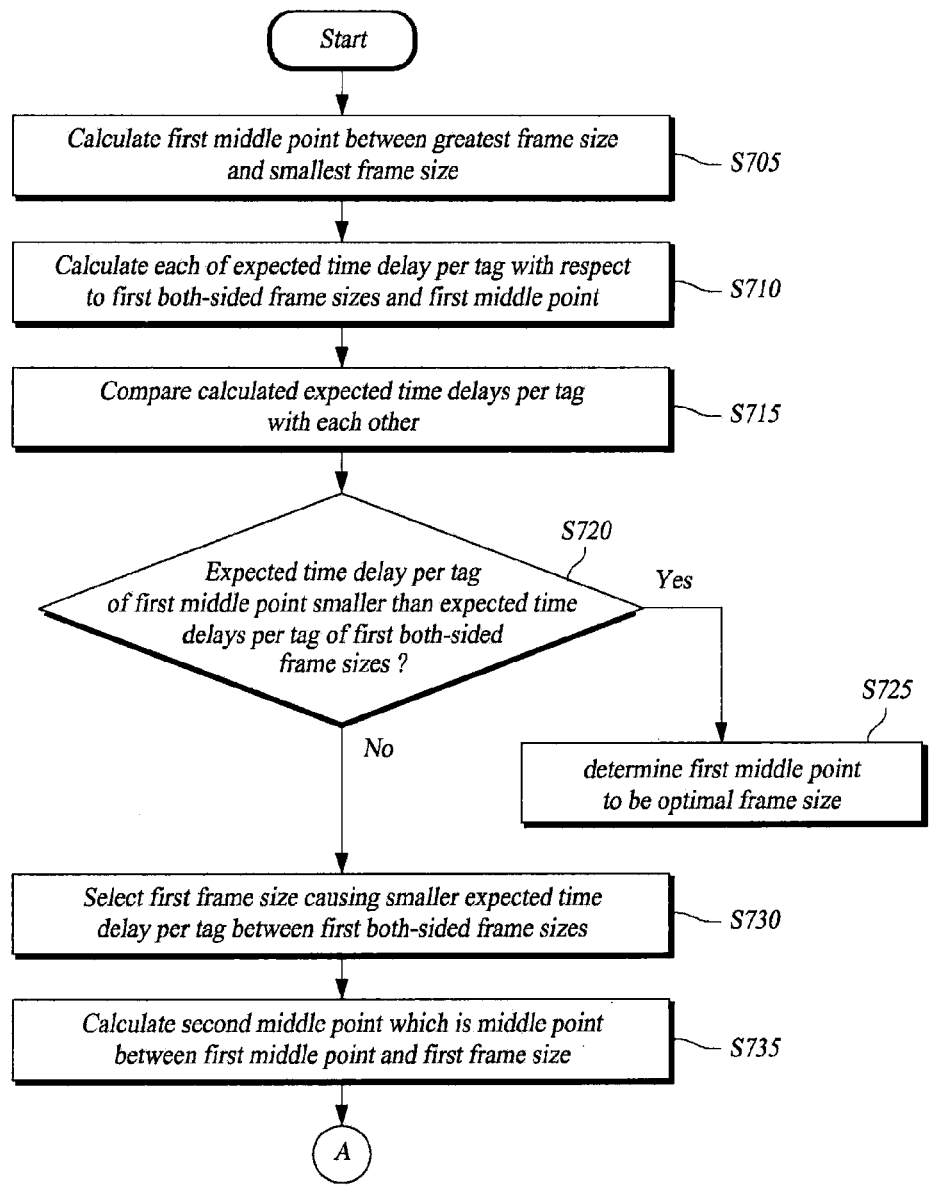
FIGS. 7 and 8 are flowcharts illustrating a procedure for determining an optimal frame size according to a second embodiment of the present invention.
Figure 8:
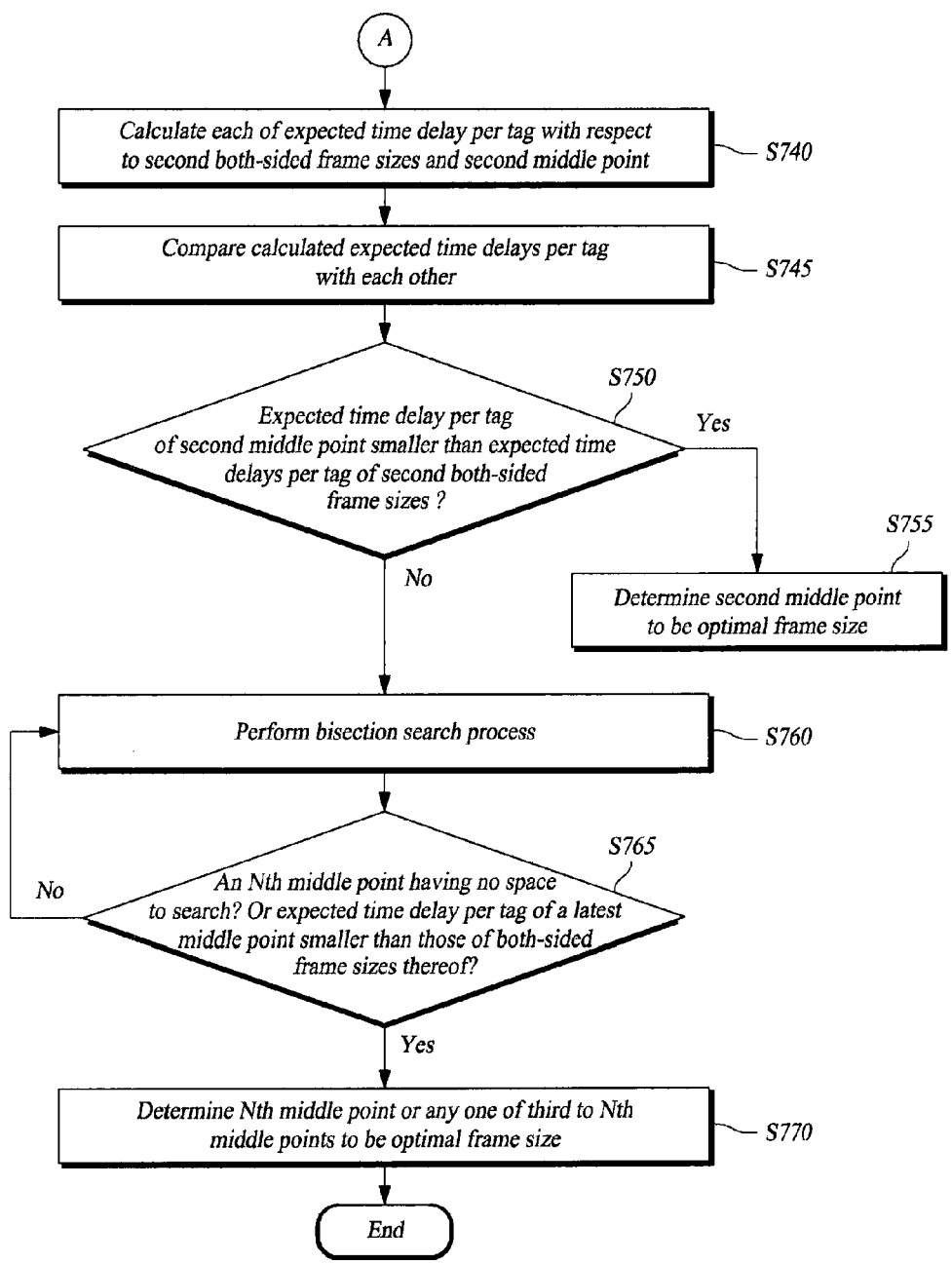

FIGS. 7 and 8 are flowcharts illustrating a procedure for determining an optimal frame size according to a second embodiment of the present invention.

The second embodiment of the present invention is used for the RFID reader 210 to complete the first process and then to determine an optimal frame size through a bisection search process when the throughput of the RFID reader 210 is low.

After completing the first process, the RFID reader 210 arranges a plurality of available frame sizes in regular sequence, as shown in FIG. 4, and calculates a first middle point, which is a middle point between a minimum frame size and a maximum frame size among the plurality of frame sizes, in step 705.

The RFID reader 210 substitutes the number of slots of the first middle point, and the numbers of slots of first both-sided frame sizes, including the minimum and maximum frame sizes which are furthest away from the first middle point, into equation 1, respectively, in step 710, and compares calculated expected time delays per tag with each other in step 715. Here, the RFID reader 210 can recognize the number of tags required for calculating an expected time delay per tag through the first process performed by the RFID reader 210, and "Tsucc," "Tcoll," and "Tidle," which are time delays caused by a success slot, a collision slot, and an idle slot, respectively, are stored in an internal memory of the RFID reader 210.

The RFID reader 210 determines if the expected time delay per tag of the first middle point is smaller than the expected time delays per tag of the first both-sided frame sizes in step 720.

When the expected time delay per tag of the first middle point is smaller than the expected time delays per tag of the first both-sided frame sizes, the RFID reader 210 determines the frame size of the first middle point to be an optimal frame size in step 725. In this case, the RFID reader 210 stops the bisection search process, and transmits the optimal frame size determined in step 725, that is, the frame size of the first middle point, to the plurality of tags 220.

When the expected time delay per tag of the first middle point is greater than the expected time delays per tag of the first both-sided frame sizes in step 720, the RFID reader 210 selects a first frame size, causing a relatively smaller expected time delay per tag between the first both-sided frame sizes in step 730, and again calculates a middle point (hereinafter, referred to as a "second middle point") between the first middle point and the first frame size in step 735. Thereafter, the RFID reader 210 substitutes the number of slots of the second middle point, and the numbers of slots of second both-sided frame sizes, that is, the first frame size and the first middle point, with respect to the second middle point, into equation 1, respectively, in step 740, and compares calculated expected time delays per tag with each other in step 745.

The RFID reader 210 determines if the expected time delay per tag of the second middle point is smaller than those of the second both-sided frame sizes in step 750.

When the expected time delay per tag of the second middle point is smaller than those of the second both-sided frame sizes in step 750, the RFID reader 210 determines the frame size of the second middle point to be an optimal frame size in step 755. In this case, the RFID reader 210 stops the bisection search process, and transmits the optimal frame size determined in step 755, that is, the frame size of the second middle point, to the plurality of tags 220.

When the expected time delay per tag of the second middle point is greater than those of the second both-sided frame sizes in step 750, the RFID reader 210 resumes the bisection search process in step 760.

The RFID reader 210 determines if a middle point calculated in step 760 corresponds to an $N^{th}$ middle point having no space to search, and if an expected time delay per tag of the middle point calculated in step 760 is smaller than those of both-sided frame sizes of the corresponding middle point in step 765. When the middle point calculated in step 760 does not correspond to the $N^{th}$ middle point, and the expected time delay per tag of the middle point calculated in step 760 is greater than those of both-sided frame sizes of the corresponding middle point, the RFID reader 210 returns to step 760.

When the middle point calculated in step 760 corresponds to the $N^{th}$ middle point having no space to search, or when the expected time delay per tag of the middle point is smaller than those of both-sided frame sizes of the corresponding middle point, the RFID reader 210 determines the frame size of the corresponding middle point to be an optimal frame size in step 770. In this case, the RFID reader 210 transmits the optimal frame size determined in step 770 to the plurality of tags 220.

As described above, when the RFID reader 210 determines an optimal frame size according to the first or second embodiment of the present invention, and identifies the identifiers of tags 220, including the first tag 221, the second tag 222, the third tag 223, the fourth tag 224, and the fifth tag 225, the collision phenomenon between the identifiers and the idle phenomenon can be minimized.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention has been described not for limiting the scope of the invention, but for describing the invention. Accordingly, the scope of the invention is not to be limited by the above embodiment but by the claims and the equivalents thereof. It will be understood by those skilled in the art that various changes in form and details may be made therein without departing from the spirit and scope of the invention as defined by the appended claims.

INDUSTRIAL APPLICABILITY

As described above, according to the present invention, a method for exactly estimating an appropriate frame size in an Aloha-based RFID system is employed, thereby increasing the number of tags which can be processed within a short time period in the RFID system.

The invention claimed is:

1. A method for determining an optimal frame size for tag collision prevention in a radio frequency identification (RFID) system in which frame sizes limited to a certain unit are used to identify a plurality of tags, the method comprising the steps of:

(a) calculating, by an RFID reader, an estimated frame size value which minimizes expected time delay per tag, the RFID reader identifying the tags and calculating the estimated frame size value in accordance with the following equation:

$$ * \left\{ 1 - e^{\frac{1+W\left(\frac{r-1}{e}\right)}{m}} \right\}^{-1} + $$

(wherein "e" represents an Euler's constant, $$ "W\left(\frac{r-1}{e}\right)" $$

represents a Lambert omega function, "*" represents a floor function, and "r" represents a rate obtained by dividing a time delay of an idle slot by a time delay of a collision slot);

(b) calculating, by the RFID reader, expected time delays per tag of a left-hand frame size which is smaller than and closest to the estimated frame size value, and a right-hand frame size which is greater than and closest to the estimated frame size value;

(c) comparing, by the RFID reader, the expected time delay per tag of the left-hand frame size with that of the right-hand frame size; and (d) determining, by the RFID reader, a frame size which has a smaller expected time delay per tag, between the left-hand frame size and the right-hand frame size, to be an optimal frame size.

2. The method as claimed in claim 1, wherein, in step (b), the RFID reader calculates the expected time delay per tag of the left-hand frame size, and the expected time delay per tag of the right-hand frame size by means of an equation, $$\left\{\frac{m}{L}\left(1-\frac{1}{L}\right)^{m-1}\right\}^{-1} X \left\{1-\left(1-\frac{1}{L}\right)^m\left(1+\frac{m}{L-1}\right) XTcoll + \left(1-\frac{1}{L}\right)^m XTidle + \frac{m}{L}\left(1-\frac{1}{L}\right)^{m-1} XTsucc\right\}$$

(wherein "L" represents the number of slots in one frame (i.e., frame size), "m" represents the number of tags, "Tsucc" represents a time delay caused by a success slot, "Tcoll" represents a time delay caused by a collision slot, and "Tidle" represents a time delay caused by an idle slot).

3. The method as claimed in claim 1, further comprising a step of (e) transmitting, by the RFID reader, the optimal frame size to the tags.

4. A method for determining an optimal frame size for tag collision prevention in a radio frequency identification (RFID) system in which a plurality of frame sizes are used to identify a plurality of tags, the method comprising the steps of:

(a) calculating, by an RFID reader, a first middle point which is a middle point of the plurality of frame sizes;

(b) calculating, by the RFID reader, an expected time delay per tag with respect to each of the first middle point and first both-sided frame sizes, with the first both-sided frame sizes including a minimum frame size and a maximum frame size among the plurality of frame sizes;

(c) comparing, by the RFID reader, the expected time delay per tag of the first middle with the expected time delays per tag of the first both-sided frame sizes;

(d) determining, by the RFID reader, the first middle point to be an optimal frame size when the expected time delay per tag of the first middle point is smaller than the expected time delays per tag of the first both-sided frame sizes in step (c);

(e) calculating, by the RFID reader, a second middle point, which is a middle point between the first middle point and a first frame size causing a smaller expected time delay per tag between the first both-sided frame sizes when the expected time delay per tag of the first middle point is greater than the expected time delays per tag of the first both-sided frame sizes in step (c), and then calculating an expected time delay per tag with respect to each of the second middle point and second both-sided frame sizes which include the first frame size and the first middle point;

(f) comparing, by the RFID reader, the expected time delay per tag of the second middle point with the expected time delays per tag of the second both-sided frame sizes;

(g) determining, by the RFID reader, the second middle point to be the optimal frame size when the expected time delay per tag of the second middle point is smaller than the expected time delays per tag of the second both-sided frame sizes in step (f); and (h) repeatedly performing, by the RFID reader, a bisection search process which includes steps (a) to (g) until the optimal frame size is determined from among the plurality of frame sizes, when the expected time delay per tag of the second middle point is greater than the expected time delays per tag of the second both-sided frame sizes in step (f).

5. The method as claimed in claim 4, wherein the RFID reader calculates the expected time delays per tag by means of an equation, $$\left\{\frac{m}{L}\left(1-\frac{1}{L}\right)^{m-1}\right\}^{-1} X \left\{1-\left(1-\frac{1}{L}\right)^m\left(1+\frac{m}{L-1}\right) XTcoll + \left(1-\frac{1}{L}\right)^m XTidle + \frac{m}{L}\left(1-\frac{1}{L}\right)^{m-1} XTsucc\right\}$$

(wherein "L" represents the number of slots in one frame (i.e. frame size), "m" represents the number of tags, "Tsucc" represents a time delay caused by a success slot, "Tcoll" represents a time delay caused by a collision slot, and "Tidle" represents a time delay caused by an idle slot).

6. The method as claimed in claim 4, further comprising, after step (d), a step of (d1) stopping, by the RFID reader, the bisection search process, and transmitting a frame size of the first middle point to the plurality of tags.

7. The method as claimed in claim 4, further comprising, after step (g), a step of (g1) stopping, by the RFID reader, the bisection search process, and transmitting a frame size of the second middle point to the plurality of tags.

8. The method as claimed in claim 4, further comprising a step of (i) stopping, by the RFID reader, the bisection search process when the optimal frame size is determined in step (h), and transmitting the optimal frame to the plurality of tags.

* * * * *